(12) United States Patent
Torres Aso et al.

(10) Patent No.: US 10,532,362 B2
(45) Date of Patent: Jan. 14, 2020

(54) STATIC PLANT FOR PREPARING FEED MIXES FOR RUMINANT LIVESTOCK

(71) Applicant: GRUPO TATOMA, S.L., Monzon, Huesca (ES)

(72) Inventors: Fernando Torres Aso, Huesca (ES); Ramon Mallada Albiol, Huesca (ES)

(73) Assignee: GRUPO TATOMA, S.L., Monzon, Huesca (ES)

( * ) Notice: Subject to any disclaimer, the term of this patent is extended or adjusted under 35 U.S.C. 154(b) by 281 days.

(21) Appl. No.: 15/316,388

(22) PCT Filed: Jun. 30, 2015

(86) PCT No.: PCT/ES2015/070507
§ 371 (c)(1),
(2) Date: Dec. 6, 2016

(87) PCT Pub. No.: WO2016/001467
PCT Pub. Date: Jan. 7, 2016

(65) Prior Publication Data
US 2017/0188620 A1   Jul. 6, 2017

(30) Foreign Application Priority Data

Jul. 1, 2014   (ES) .................................. 201430987

(51) Int. Cl.
*B02C 25/00* (2006.01)
*B02C 19/00* (2006.01)
(Continued)

(52) U.S. Cl.
CPC ............ *B02C 25/00* (2013.01); *A23N 17/007* (2013.01); *B01F 3/1271* (2013.01); *B01F 13/10* (2013.01); *B01F 13/1041* (2013.01);
*B01F 13/1055* (2013.01); *B01F 15/00136* (2013.01); *B01F 15/00194* (2013.01); *B01F 15/0229* (2013.01); *B01F 15/0251* (2013.01); *B02C 18/22* (2013.01); *B02C 19/0056* (2013.01);
(Continued)

(58) Field of Classification Search
CPC ..... B02C 25/00; B02C 19/0056; B02C 18/22; B02C 23/02; A23N 17/007
USPC ...... 241/101.2, 101.8, 222, 223, 224, 152.1, 241/152.2, 134
See application file for complete search history.

(56) References Cited

U.S. PATENT DOCUMENTS 3,806,001 A * 4/1974 Pratt .................... A23N 17/007
222/1
5,240,324 A   8/1993 Phillips et al.
(Continued)

FOREIGN PATENT DOCUMENTS

DE  3321731 A1  12/1984
EP  1625787 A2  2/2006
(Continued)

*Primary Examiner* — Faye Francis
(74) *Attorney, Agent, or Firm* — Notaro, Michalos & Zaccaria P.C.

(57) ABSTRACT

Static plant for preparing feed mixes for ruminant livestock, having a conveyor unit for conveying the feed mix ingredients, chain and/or screw feeders, feeders with weight sensors and supplementary conveyor belt, silos of solid ingredients, and silos of liquid ingredients, independently supplying via the conveyor unit, with dual flow, two or more high-capacity mixers.

3 Claims, 4 Drawing Sheets

(51) Int. Cl.
  *B02C 23/02*   (2006.01)
  *B02C 18/22*   (2006.01)
  *B01F 13/10*   (2006.01)
  *A23N 17/00*   (2006.01)
  *B01F 3/12*    (2006.01)
  *B01F 15/00*   (2006.01)
  *B01F 15/02*   (2006.01)
  *B02C 18/14*   (2006.01)

(52) U.S. Cl.
  CPC ........ *B02C 23/02* (2013.01); *B01F 2013/108* (2013.01); *B01F 2013/1086* (2013.01); *B01F 2215/0008* (2013.01); *B01F 2215/0024* (2013.01); *B02C 2018/147* (2013.01)

(56) References Cited

U.S. PATENT DOCUMENTS

| | | | | |
|---|---|---|---|---|
| 8,052,842 B2* | 11/2011 | Pittman | ................. | B27N 1/029 162/225 |
| 8,152,358 B2* | 4/2012 | Conard | ............... | B01F 7/00708 366/141 |
| 2007/0092617 A1* | 4/2007 | Burgos | ................. | A23N 17/007 426/519 |
| 2010/0263345 A1* | 10/2010 | Goldenberg | ........ | A01F 25/2027 56/10.2 R |

FOREIGN PATENT DOCUMENTS

| | | |
|---|---|---|
| EP | 1938682 A2 | 7/2008 |
| EP | 2140758 A2 | 1/2010 |
| ES | 344747 A1 | 10/1968 |
| ES | 2138522 A1 | 1/2000 |
| ES | 2204136 T3 | 4/2004 |
| FR | 2586170 A1 | 2/1987 |
| GB | 2218613 A | 11/1989 |
| NL | 1023476 C2 | 11/2004 |
| WO | 2014021716 A1 | 2/2014 |

* cited by examiner

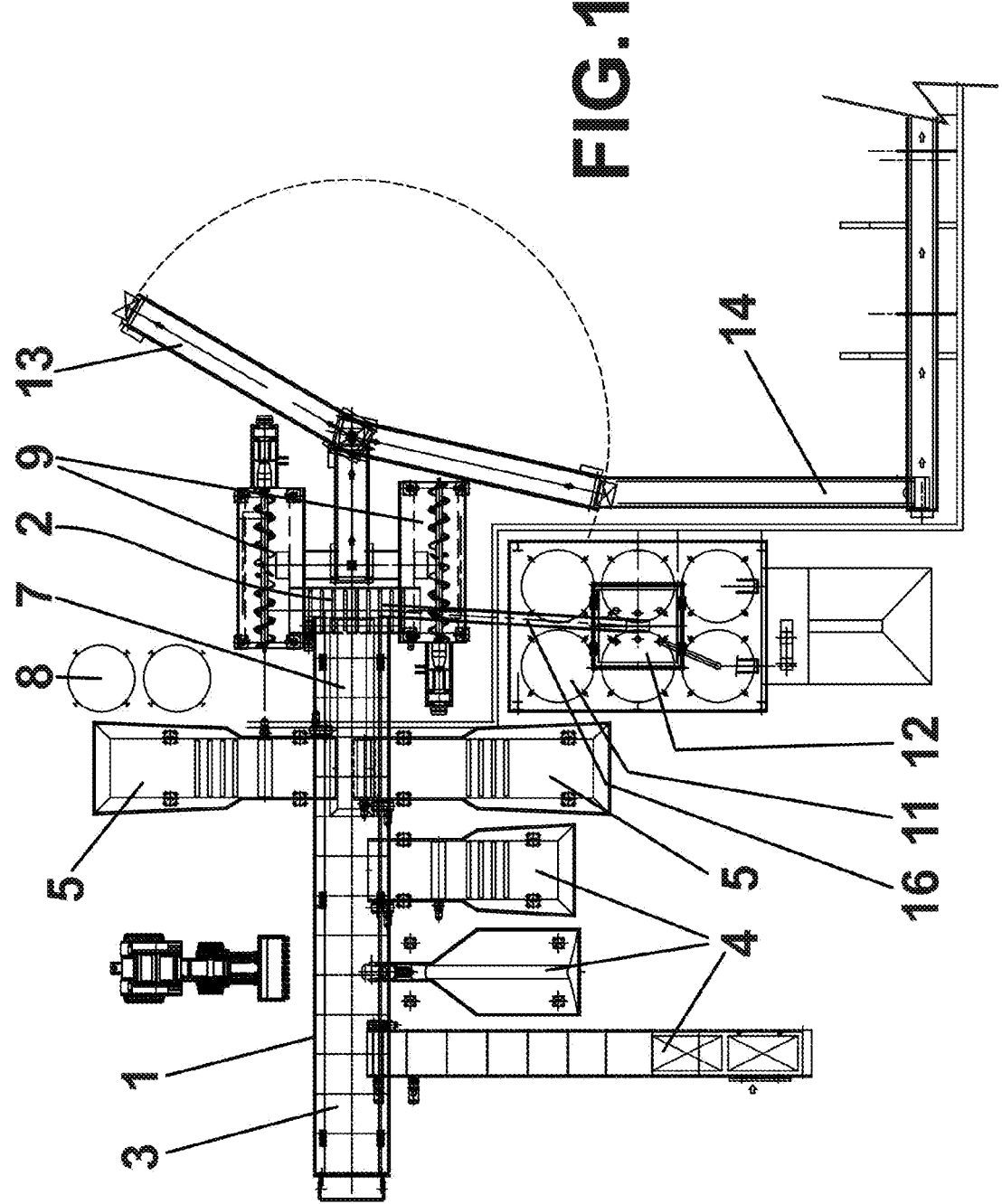

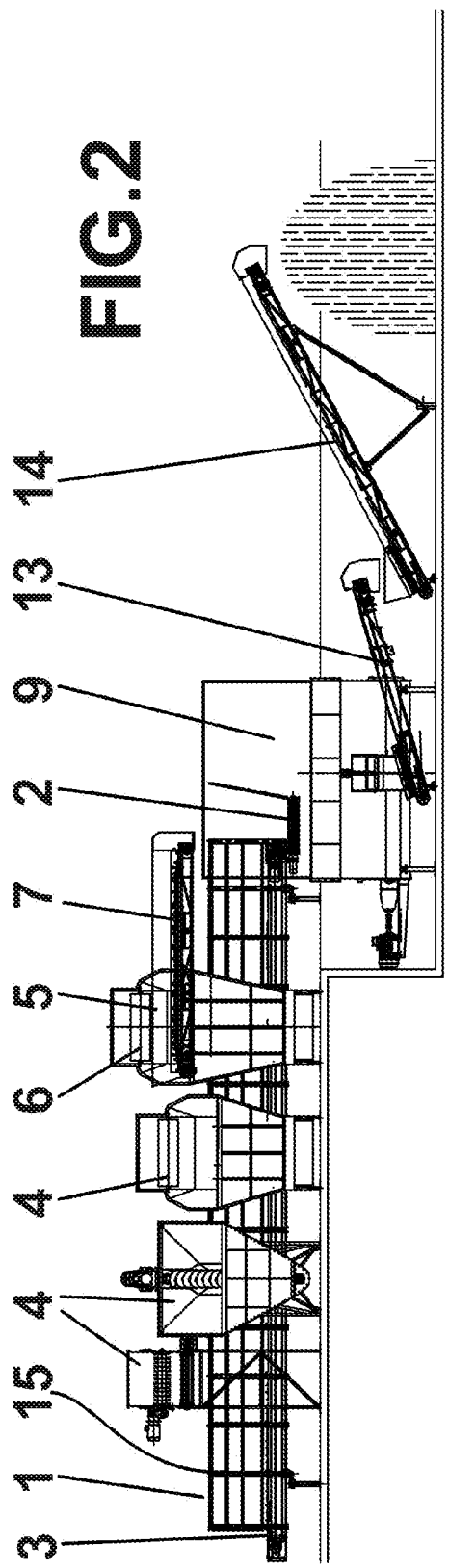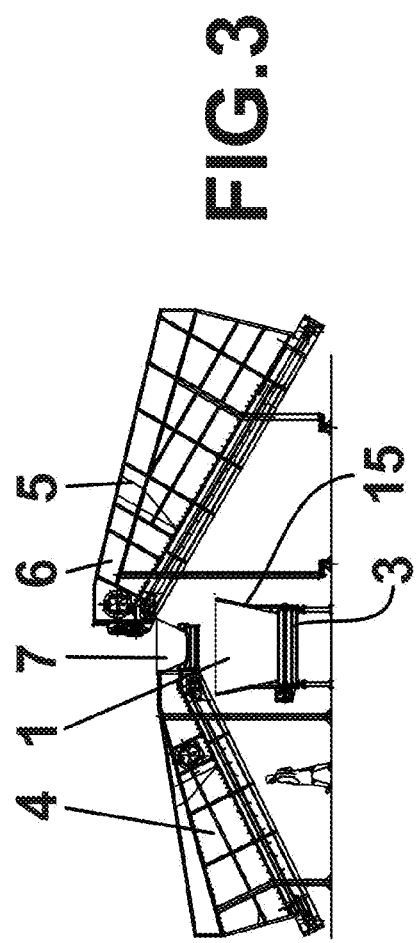

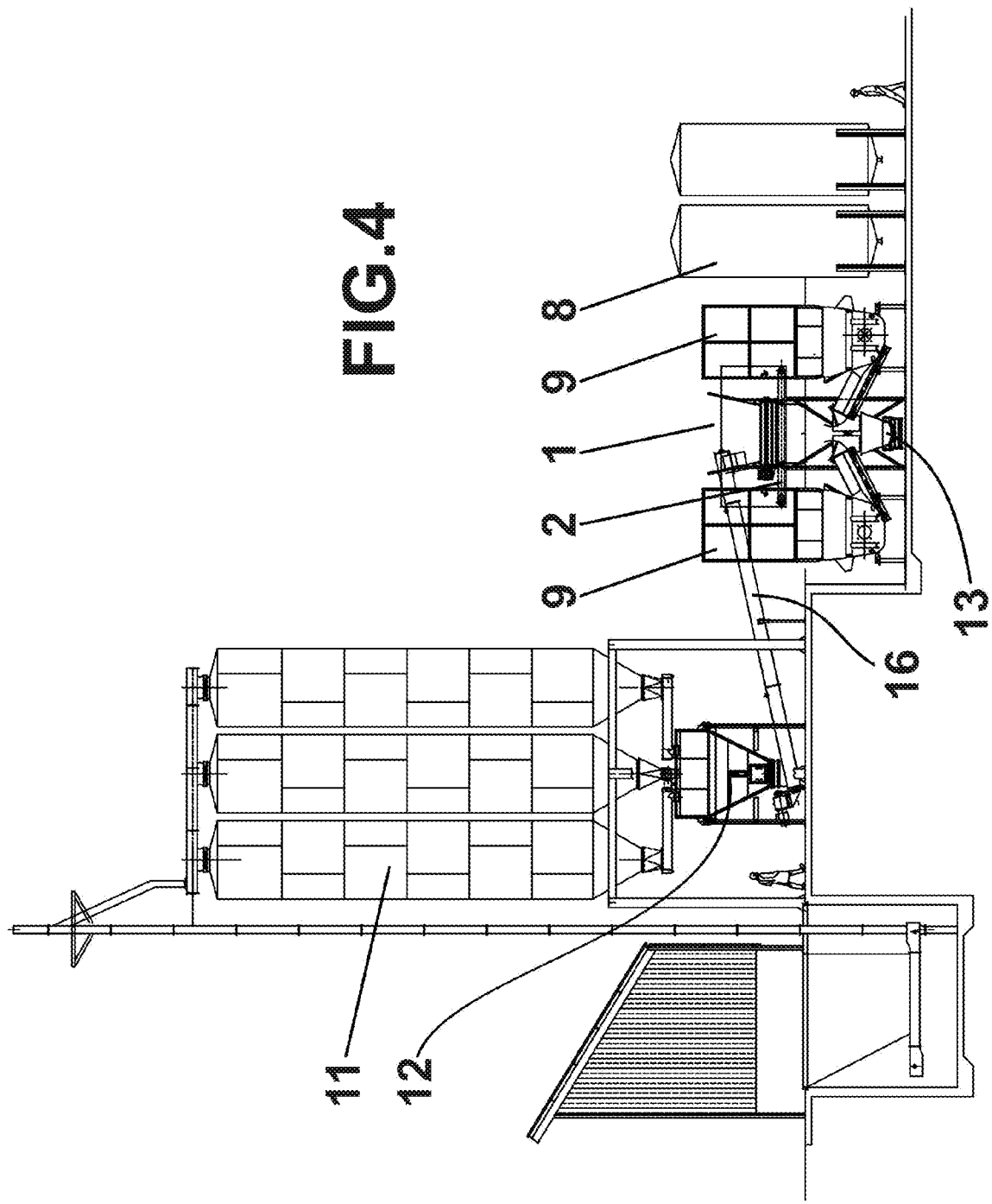

STATIC PLANT FOR PREPARING FEED MIXES FOR RUMINANT LIVESTOCK

OBJECT OF THE INVENTION

Static plant for preparing feed mixes for ruminant livestock, comprising a conveyor unit for conveying feed mix ingredients, chain and/or screw feeders, feeders with weight sensors and with supplementary conveyor belt, silos of solid ingredients and silos of liquid ingredients, independently supplying two or more mixers that incorporate weight control means to improve the accuracy of the ingredient mix, which, once carried out, is discharged onto any type of known device using discharging means, for the distribution of the mix.

The object of the invention is to obtain, by means of a static plant configured on different levels, a high degree of productivity, sufficient to feed more than 1,500 heads of livestock/hour, since, by establishing a dual flow of feed onto the mixer with the supplementary conveyor belt, when one discharge cycle of the conveyor unit comes to an end, a new, totally automated cycle begins, achieving the optimization of mixing times, accuracy in the batching of ingredients and assuring product quality.

BACKGROUND OF THE INVENTION

At present, different types of plants for obtaining homogenous mixes to feed ruminant livestock are already known.

Patent WO2014021716 describes a "processing of blocks or bales of feed", consisting of a movable mixing bin and a platform with a fixed floor to contain one or more rows of blocks or bales of feed, which are cut and deposited in a mixing bin to be weighed, with the drawback that this type of plant is only configured for mixes of different types of baled forage for use on small farms, and with the added drawback that there are no means for incorporating solid and liquid additives to the mix via silos.

Another example of similar characteristics can be found in patent NL1023476, which describes a mechanically controlled feeding system for hay that receives complete bales that are methodically broken up into servings for animal feed, with the drawback that this setup can only handle mixes of hay forage, with no means of adding other ingredients.

Patent EP1938682 describes an apparatus and method for separating and mixing feed for livestock consisting of several conveyor belts, positioned in line, receiving one or more feed bales that are cut into pieces by a moving cutting unit and directed to a moving mixing bin which, after carrying out mixing, distributes the mix to the ruminant livestock, but with the same drawback as in the previous examples, namely that this type of plant is only effective on small family-type farms.

Patent EP1625787 describes apparatuses for separating and mixing feed for livestock, consisting of at least two conveyor belts positioned in line and equipped with a weight sensor, intended for supplying a mixing space, and delivery means for delivering a feed mix from the mixing space, or, by means of a moving mixer to subsequently distribute the mix, but with the drawback that productivity is reduced considerably when the mixer is withdrawn to distribute the mix made, and that furthermore, there is no means of incorporating concentrated and liquid ingredients from silos.

Patent EP2140758 describes an apparatus for separating and mixing feed for livestock, consisting of several conveying alleys with means for discharging bales of feed from a supply side to a discharge side, corresponding to a conveyor belt that is directly connected to a moving mixer which, as in the previous cases, is designed to share out or distribute the mix, but which notably reduces productivity, this type of plants being especially useful on small livestock farms.

DESCRIPTION OF THE INVENTION

The present invention aims to eliminate the aforementioned problems by means of a static plant for preparing feed mixes for ruminant livestock, in response to new market needs that require more efficient systems from the point of view of cost and energy-saving, systems that are more reliable and capable of ensuring homogeneous, high quality mixes, contributing to the correct physiological development of livestock in terms of milk production and diet in general, affording better qualities and production, and also in terms of livestock fertility and genetics, which comprises a conveyor unit for conveying the feed mixes, chain and/or screw feeders, feeders with weight sensors and with supplementary conveyor belt, silos of solid ingredients and silos of liquid ingredients that independently supply two or more mixers, which incorporate weight control means to improve the accuracy of the mix of ingredients, which, once carried out, is discharged, using discharging means, over any type of known device, for the distribution of the mix.

This static plant is configured on different levels, affording a high level of productivity, sufficient to feed more than 1,500 heads of livestock/hour, since by establishing a dual flow of feed onto the mixer with the supplementary conveyor belt, when one discharge cycle of the conveyor unit comes to an end, a new totally automated cycle begins.

The conveyor unit comprises a horizontal conveyor belt with a weighing system, equipped at one end with a cross belt, the horizontal conveyor belt being fitted on both sides with reinforcements to facilitate guidance of the ingredients to be mixed, which are gradually deposited via the different feeders, positioned on either side of the said conveyor belt.

The horizontal conveyor belt incorporates, at the discharging end of the ingredients to be mixed contained on it, a cross belt that directs the ingredients to the different mixers.

The feeders, with weight sensors incorporating a cutting mill in their discharge zone, positioned at either side of the horizontal conveyor belt and opposite each other, are linked together by means of a supplementary conveyor belt, parallel to the horizontal conveyor belt and positioned at a higher level, supplying the cross belt separately from the conveyor unit.

All of the chain and/or screw feeders and the feeders with weight sensors and with supplementary conveyor belt integrated in the plant are filled using wheel loaders due to their large capacity content, enabling continuous mixing cycles to be carried out.

The silos of solid ingredients incorporate a hopper equipped with weight control means, which controls the ingredients before they are discharged onto the cross belt via a screw feeder.

The silos of liquid ingredients include a piping installation with flow gauge, allowing direct and controlled discharge of the liquid ingredients onto the mixer that is active at that moment.

The mixers are horizontal or vertical type mixers, fitted with one or more screw feeders, all being of the same type or a combination of both types, with a high capacity, incorporating weight sensors, laser sensors to measure distances to determine a map of level curves that can be compared with a reference map previously defined in mixes analyzed and considered to be of a very high quality, in order to control the mix obtained; also incorporating strain gauges placed at different points on the drum to determine deformation of the said drum on the three spatial axes, indicating the degree to which ingredients are flowing and mixing and whether or not immediate corrective measures are required.

The mixers include a slewing discharge conveyor belt for discharge and distribution of the mix and they are positioned at a lower level in relation to the horizontal conveyor belt and feeder unit, to facilitate discharge of ingredients.

Operating Cycle:
  Sequentially, batching of ingredients onto the horizontal conveyor belt of the conveyor unit begins, the said conveyor belt being in a stopped state. The ingredients located in the feeders are batch-discharged, being emptied onto the cross belt that directs the ingredients to the different mixers that make up the system, the said mixers being activated when the ingredients begin to be discharged into them.
  At the same time, the ingredients in the feeders with supplementary conveyor belt, equipped with weight sensors, begin to be batched and discharged onto a supplementary conveyor belt, parallel to the main conveyor belt unit and raised.
  In turn, the supplementary conveyor belt discharges onto the cross belt, which directs the ingredients to the different mixers. This produces a separate, dual flow of ingredients onto the mixer.
  Simultaneously, the ingredients in the silo of solid ingredients are also batched onto a weighing hopper. Once the process has been completed, the entire contents of the hopper are directed by a screw conveyor to the cross belt.
  The ingredients located in the silos of liquid ingredients, which comprises a piping installation with flow gauge, are discharged directly onto the active mixer.
  The mixers are fitted with a weighing system, laser sensors and strain gauges to control mixing, enabling greater accuracy and hence a better quality mix.
  When all of the ingredients have been mixed, they are distributed, by means of a slewing discharge conveyor belt, either directly for storage or for distribution using any type of known device (tractor plus trailer, sacks, delivery trucks, self-guided or automated systems, pressed into bales . . . )
  As soon as the horizontal conveyor belt of the conveyor unit finishes discharging ingredients, a new cycle begins, thus optimizing mixing times, the accuracy of ingredient batching and assuring product quality.

ADVANTAGES OF THE INVENTION

The static plant for preparing feed mixes for ruminant livestock presented, affords numerous advantages with respect to those currently available, the most important being that it enables a high level of productivity, sufficient to feed more than 1,500 heads of livestock/hour, since by establishing a dual flow of feed onto the mixer with the supplementary conveyor belt, when one discharge cycle of the horizontal conveyor belt of the conveyor unit comes to an end, a new totally automated cycle begins, thus optimizing mixing times, the accuracy of ingredient batching and assuring product quality.

Another basic advantage is the incorporation of a conveyor unit comprising a horizontal conveyor belt fitted, at one of its ends, with a cross belt to supply the mixers, emptying the ingredients onto them, with weight control means.

Likewise, another important advantage is the incorporation of feeders with weight sensors and with supplementary conveyor belt, affording the plant greater production capacity.

Another noteworthy advantage is that the quality of the ingredient mix is enhanced by incorporating solid ingredients and liquid ingredients, added from the corresponding silos.

A further advantage is that the mixers incorporate weight sensors, laser sensors and strain gauges which, when placed at different points on the drum, allow the control and homogeneity of the mix.

Lastly, an added advantage is that, since this is a totally automated static plant, there is a considerable reduction in work times and labour.

DESCRIPTION OF THE FIGURES

To afford a better understanding of this invention a preferred practical embodiment is shown in the drawing attached.

In the drawing, FIG. 1—shows a plan view of the static plant for preparing feed mixes for ruminant livestock.

FIG. 2—shows an elevation view of the static plant for preparing feed mixes for ruminant livestock, showing the difference in level.

FIG. 3—shows an elevation view of the feeders, positioned with the conveyor belts.

FIG. 4—shows an elevation view of the static plant for preparing feed mixes for ruminant livestock.

PREFERRED EMBODIMENT OF THE INVENTION

Figure 5:
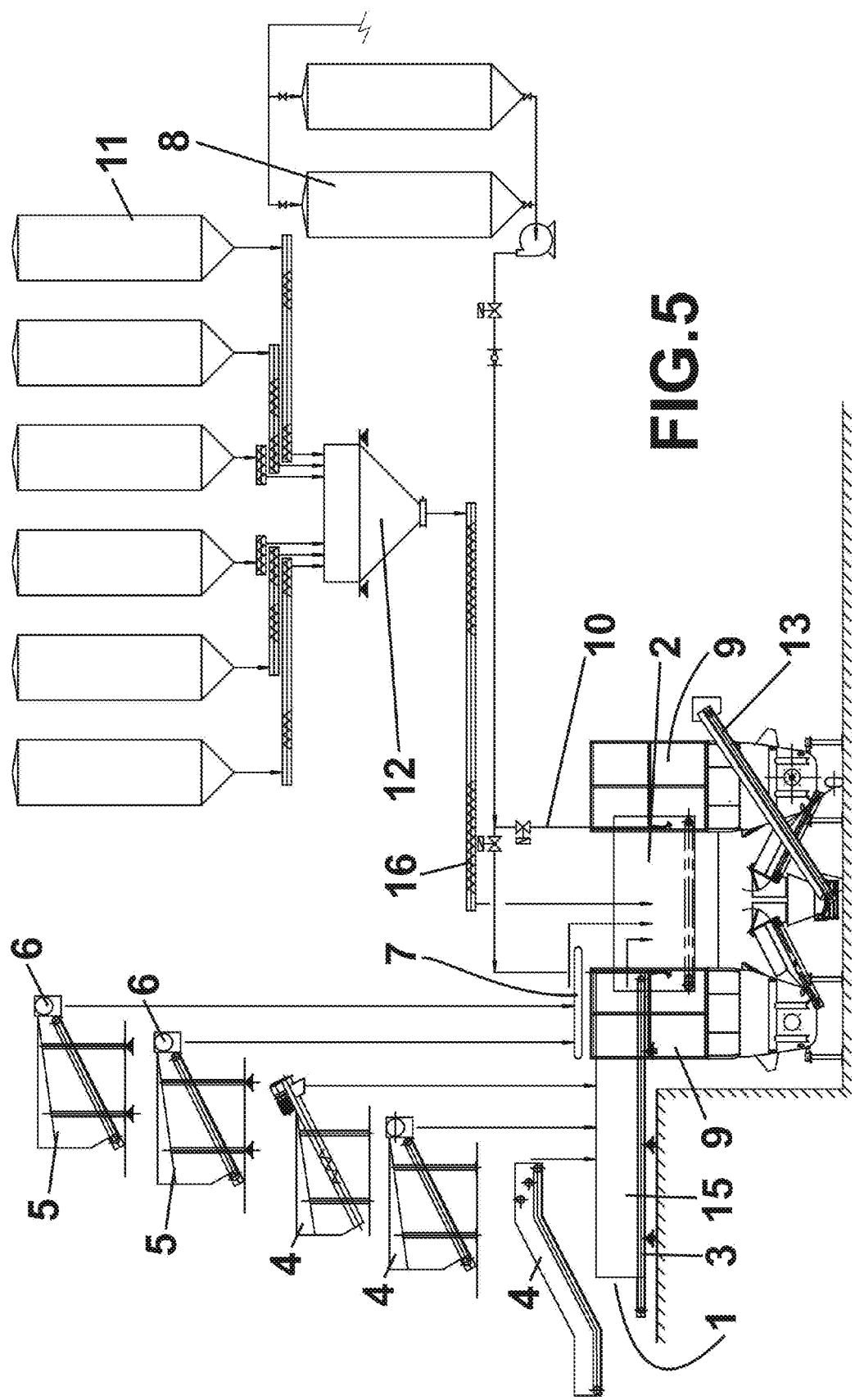
FIG. 5—shows a flow diagram of the static plant for preparing feed mixes for ruminant livestock.

The composition, characteristics and procedure of the static plant for preparing feed mixes for ruminant livestock that is the subject matter of the present invention, can be better understood in the following description, referring to a preferred embodiment shown in the attached figures.

FIG. 1 shows a plan view of the invention, comprising a conveyor unit (1), comprised by a horizontal conveyor belt (3), fitted at its discharge end with a cross belt (2), intended to supply one or more mixers (9).

It also shows the chain and/or screw feeders (4), intended for supplying their contents to the horizontal conveyor belt (3), in a measured manner, being located on one or both sides of the said conveyor belt.

Very near to the discharge zone and positioned opposite each other, are the feeders with weight sensors (5), characteristic of the invention, which incorporate a cutting mill (6) in their discharge zone, the said feeders being positioned on either side of the horizontal conveyor belt (3) and opposite each other, being linked together by means of a supplementary conveyor belt (7), parallel to the horizontal conveyor belt (3) and positioned at a higher level, supplying the cross belt (2).

Also depicted alongside the different feeders is a wheel loader to supply the contents of feeders that have a large capacity, unlike existing plants in which the feeders have a small capacity and can be loaded with hand shovels.

Sideways to the conveyor unit there is also enough space for the wheel loader to discharge directly, so that in the event of one or several of the feeders breaking down, loading of all the solid ingredients can be carried out manually.

The silos of liquid ingredients (8) are shown positioned very near to the mixers (9), since these silos have a piping installation (10) with flow gauge allowing direct and controlled discharge of the liquid ingredients onto the mixer (9) that is active at that moment.

The silos of solid ingredients (11) are also shown, having a weighing hopper (12) to release the exact amount of ingredients onto the cross belt (2) that discharges them into the corresponding mixer (9).

In FIG. 1, although two mixers (9) are shown, the static plant can be configured with more mixers (9), in anticipation of possible repairs or maintenance on one of the mixers, in order to maintain the level of productivity.

The mixers (9) include weight sensors, laser sensors to measure distances and determine a level curve map to control the mix obtained, also incorporating strain gauges placed at different points on the drum to determine its deformation on the three spatial axes. The mixers (9) are positioned at a lower level in relation to the horizontal conveyor belt (3) and feeders (4 and 5), to facilitate the discharge of ingredients.

The slewing discharge conveyor belt (13) of the mixers (9) is shown discharging the mix obtained onto a circuit of conveyor belts (14), envisaged for the distribution of the mix by known means.

FIG. 2 shows an elevation view of the static plant for preparing feed mixes for ruminant livestock, showing the difference in level between the conveyor unit (1) and feeders (4 and 5), in relation to the mixers (9), located at a lower level.

This FIG. 2 shows the guiding sides (15) of the horizontal conveyor belt (3), incorporating at its end a cross belt (2) to supply the mixers (9) with the ingredients.

It also shows the supplementary conveyor belt (7) linked to the feeders with weight sensors (5), in which its raised position in relation to the conveyor unit (1) can be seen.

On the lower level, the position of the mixers (9) is shown and the slewing discharge conveyor belt (13) discharging the mix onto any of the different known devices, for storage and for distribution of the mix.

FIG. 3 shows a front detail of the positioning of the chain and/or screw feeders (4) at different heights in relation to the feeders with weight sensors (5), characteristic of the invention.

This view shows the horizontal conveyor belt (3) with its guiding sides (15) and the raised supplementary conveyor belt (7), linked to the feeder with weight sensors (5).

FIG. 4 provides an elevation view of the static plant for preparing feed mixes for ruminant livestock, showing the difference in height between the different devices that form it, showing the silos of solid ingredients (11) equipped with a hopper (12) with weight control means, to discharge the ingredients onto the cross belt (2) by means of a screw feeder (16).

It also shows the silos of liquid ingredients (8) directly connected to the mixers (9) via a piping installation (10) with flow gauges to control discharges.

Furthermore it depicts, on a lower level, the mixers (9) equipped with slewing discharge conveyor belts (13), showing the position of the horizontal conveyor belt (3) fitted with a cross belt (2).

FIG. 5 shows a flow diagram in which the height difference of the plant can be seen and, on one side, the chain and/or screw feeders (4) and the feeders with weight sensors (5), discharging ingredients onto the supplementary conveyor belt (7), and the rest of the conventional chain and/or screw feeders, discharging ingredients onto the horizontal conveyor belt (3) of the conveyor unit (1).

In addition, it shows the horizontal conveyor belt (3) linked to the cross belt (2), positioned between both mixers (9) with its slewing discharge conveyor belt (13)

The silos of solid ingredients (11) are also shown schematically, discharging ingredients onto a hopper (12) so that, once weighed, they can be discharged onto the cross belt (2) via a screw feeder (16).

Likewise, the silos of liquid ingredients (8) are shown connected to a piping installation (10) with flow gauge, directly connected to the mixer (9) that is active at the time that discharging takes place.

The invention claimed is:

1. Static plant for preparing feed mixes of several ingredients for ruminant livestock, comprising:
    a conveyor unit (1) which comprises a horizontal conveyor belt (3) onto which the ingredients of the feed mixes are discharged, the horizontal conveyor belt (3) being equipped with guiding sides (15) on either side, the horizontal conveyor belt having a discharge end,
    a cross belt (2) provided at the discharge end of the horizontal conveyor belt, the cross belt (2) adapted for supplying the feed mixes,
    a plurality of chains and/or screw feeders (4) adapted for supplying the horizontal conveyor belt (3) of the conveyor unit (1),
    a plurality of feeders with weight sensors (5) located at the discharge end of the conveyor belt, each of the plurality of feeders with weight sensors having a discharge zone, each of the plurality of feeders with weight sensors having a cutting mill (6) at its discharge zone, the plurality of feeders with weight sensors (5) being positioned on either side of the horizontal conveyor belt (3) and opposite each other, discharging at a supplementary conveyor belt (7), parallel to the conveyor unit (1) and positioned on a higher level than the conveyor unit (1), supplying the cross belt (2),
    silos adapted for holding solid ingredients (11), with a weighing hopper (12) for controlling the weight of the solid ingredients (11), connected via a screw feeder (16) to the cross belt (2),
    silos adapted for holding liquid ingredients (8), connected by a piping installation (10) with flow gauge, and
    at least two mixers (9), supplied by
        the plurality of chains and/or screw feeders (4), through the horizontal conveyor belt (3) and the cross belt (2),
        the feeders with weight sensors (5), through the supplementary conveyor belt (7) and the cross belt (2),
        the silos adapted for holding solid ingredients (11) through a weighing hopper (12), the screw feeder (16) and the cross belt (2), and
        the silos adapted for holding liquid ingredients (8) through a piping installation (10) with flow gauge, with direct discharge onto the at least two mixers (9).

2. Static plant for preparing feed mixes for ruminant livestock, according to claim 1 wherein the at least two mixers (9) are high-capacity horizontal or vertical mixers including a slewing discharge conveyor belt (13), weight sensors, laser sensors and strain gauges placed at different points, to keep control of the feed mix obtained the at least two mixers (9) being positioned at a lower level in relation to the conveyor unit (1), the plurality of chains and/or screw feeders (4) and the plurality of feeders with weight sensors (5).

3. Mixing procedure carried out by the static plant for preparing feed mixes for ruminant livestock, described in claim 1, wherein the mixing procedure has an operating cycle as follows:
- providing solid ingredients and liquid ingredients;
- sequentially batching the solid ingredients via the plurality of chains and/or screw feeders (4) onto the horizontal conveyor belt (3) of the conveyor unit (1), via the plurality of feeders with weight sensors (5) onto the supplementary conveyor belt (7), and via the silos adapted for holding solid ingredients (11) onto the weighing hopper (12);
- emptying the solid ingredients onto the cross belt (2), the solid ingredients being batched via the horizontal conveyor belt (3), the supplementary conveyor belt (7), and a supplementary screw feeder (16) from the weighing hopper (12);
- discharging the solid ingredients into the at least two mixers (9);
- directly batching the liquid ingredients into the at least two mixers (9) via the silos adapted for holding liquid ingredients (8);
- mixing the solid ingredients and the liquid ingredients in the at least two mixers (9) to make a feed mix;
- distributing feed mix via the slewing discharge conveyor belt (13) of the at least two mixers (9), and
- starting a new mixing cycle as soon as the horizontal conveyor belt (3) of the conveyor unit (1) finishes discharging the ingredients.

\* \* \* \* \*